(12) United States Patent
Schnitta et al.

(10) Patent No.: US 9,146,152 B2
(45) Date of Patent: Sep. 29, 2015

(54) METHOD OF ESTIMATING ACOUSTIC OR THERMAL LEAKAGE OF AN OBJECT AND METHOD OF ESTIMATING TRANSMISSION LOSS OF AN OBJECT, USING A SOUND FOCUSING MECHANISM

(75) Inventors: Bonnie S Schnitta, East Hampton, NY (US); Mason A Israel, East Hampton, NY (US)

(73) Assignee: Noiseout Inc

( * ) Notice: Subject to any disclaimer, the term of this patent is extended or adjusted under 35 U.S.C. 154(b) by 1072 days.

(21) Appl. No.: 13/028,997

(22) Filed: Feb. 16, 2011

(65) Prior Publication Data

US 2012/0036935 A1 Feb. 16, 2012

Related U.S. Application Data

(63) Continuation-in-part of application No. 10/682,914, filed on Oct. 14, 2003, now Pat. No. 7,908,924.

(60) Provisional application No. 60/479,189, filed on Jun. 18, 2003.

(51) Int. Cl.
*G01H 15/00* (2006.01)
*G10K 11/26* (2006.01)
*H04R 29/00* (2006.01)

(52) U.S. Cl.
CPC ............... *G01H 15/00* (2013.01); *G10K 11/26* (2013.01); *H04R 29/001* (2013.01)

(58) Field of Classification Search
CPC ....... G01H 15/00; G10K 11/26; H04R 29/001
USPC ........... 381/56, 58, 59, 61; 73/40.5, 599, 642, 73/644–646, 40, 559; 181/175, 284, 290, 181/198–205

See application file for complete search history.

(56) References Cited

U.S. PATENT DOCUMENTS

| | | | |
|---|---|---|---|
| 1,924,091 A | 6/1929 | Eisenhour | |
| 3,035,119 A | 5/1962 | Wendt | |
| 4,075,601 A * | 2/1978 | Flournoy | ..................... 367/137 |
| 4,107,775 A | 8/1978 | Ott | |
| 4,255,798 A | 3/1981 | Havira | |
| 4,379,960 A | 4/1983 | Inoue | |

(Continued)

OTHER PUBLICATIONS

"Acoustic Systems acoustical research facility official laboratory report AS-TL1945", Mar. 4, 2002.*

(Continued)

*Primary Examiner* — Vivian Chin
*Assistant Examiner* — David Ton
(74) *Attorney, Agent, or Firm* — John F. Vodopia

(57) ABSTRACT

A sound focusing mechanism for generating a focused source of sound, which can be used to identify the transmission loss of an object or identify areas of acoustic or thermal leakage is disclosed. The sound focusing mechanism includes a housing having at least one wall formed from a material having high sound insulating properties. A sound generating device for generating a sound is located with a central cavity within the housing. An actuator assembly is operatively connected to the sound generating device for selectively operating the sound generating device for selectively operating the sound generating device. The wall is configured to limit the transmission of the sound there through such that a focused beam or pulse sound is emitted from the mechanism through the opening.

13 Claims, 3 Drawing Sheets

(56) References Cited

U.S. PATENT DOCUMENTS

| | | | |
|---|---|---|---|
| 4,397,187 A | 8/1983 | Stribling | |
| 4,901,576 A | 2/1990 | Rademacher | |
| 5,045,787 A | 9/1991 | Auer et al. | |
| 5,433,104 A | 7/1995 | Kunze et al. | |
| 5,680,054 A | 10/1997 | Gauthier | |
| 5,792,955 A * | 8/1998 | Song et al. | 73/646 |
| 5,828,012 A | 10/1998 | Repolle et al. | |
| 5,862,230 A * | 1/1999 | Darby | 381/56 |
| 6,150,936 A | 11/2000 | Addy | |
| 6,220,098 B1 | 4/2001 | Johnson et al. | |
| 6,430,988 B1 * | 8/2002 | Watanabe | 73/40.5 A |
| 6,923,063 B2 | 8/2005 | Komninos | |
| 6,983,642 B2 * | 1/2006 | Stumpf | 73/40.5 A |
| 7,203,322 B1 * | 4/2007 | Bostock | 381/67 |
| 7,340,407 B1 * | 3/2008 | Fay et al. | 705/7.23 |
| 7,908,924 B2 * | 3/2011 | Schnitta et al. | 73/644 |
| 2003/0116379 A1 | 6/2003 | Khambete et al. | |
| 2004/0042625 A1 | 3/2004 | Brown | |
| 2009/0025479 A1 * | 1/2009 | Kollgaard et al. | 73/599 |

OTHER PUBLICATIONS

ASTM International, "Standard guide for field measurements of airborne sound insulation of building facade and facade elements", Jun. 2002, pp. 1-10.* http://www.sota.ca/stc_info.htm—Sound Transmission Class—Discussion and Use—captured Jun. 18, 2003.

U.S. Appl. No. 10/682,914 as of May 3, 2011.

International Search Report issued in PCT/US04/19331 on Oct. 23, 2006.

Guy, R. W., et al., Measurement of Sound Transmission Loss by Sound Intensity, Journal of Canadian Acoustical Association, vol. 2, pp. 25-44, 1985 (http://jcaa.caa-aca.ca/index.php/jcaa/article/view/542).

* cited by examiner

METHOD OF ESTIMATING ACOUSTIC OR THERMAL LEAKAGE OF AN OBJECT AND METHOD OF ESTIMATING TRANSMISSION LOSS OF AN OBJECT, USING A SOUND FOCUSING MECHANISM

CROSS REFERENCE TO RELATED APPLICATIONS

This application is a continuation-in-part application of U.S. patent application Ser. No. 10/682,914 filed Oct. 14, 2003 which in turn relates to and claims priority from U.S. Provisional Application No. 60/479,189 filed on Jun. 18, 2003. The disclosures of both applications are incorporated herein by reference in their entireties.

BACKGROUND OF THE INVENTION

1. Field of the Invention

The present invention relates to a sound focusing mechanism that generates a high sound pressure level, denoted throughout this document as decibel, and highly focused signal that is used in connection with sound proofing to locate areas of acoustic leakage. The sound focusing mechanism is also used in connection with the determination of the transmission loss of an object. The present invention is also directed to a method of locating acoustic leakage points in an object in order to improve sound proofing by focusing a high decibel sound at a desired location on an object then measuring the sound transmission loss at one of more locations. Since apertures in a wall, window or door can equally influence the thermal rating of the wall, window or door the focusing tube is also an efficient method for locating thermal leakage of such an object, as well as estimating its thermal efficiency.

2. Description of Related Art

Hearing noise from adjacent rooms, pipes, outside the dwelling or an adjacent dwelling is something that many people are disturbed by on a daily basis. At a minimum, it can be distracting. The increasing International Code council mandates on acoustics in hospitals, classrooms, etc demonstrate the increasing realization that noise can have negative effects from ability to retain read information to general health and ability to sleep. Many spend large sums of money to reduce the overall transmission of sound into and/or through their dwellings in order to create quieter and calmer surroundings. This, however, does not always produce the desired results. In many circumstances, the person(s) performing the acoustic modifications to the structure does not provide adequate sound insulation or improperly installs the same such that the disturbing noises are still transmitted through the structure.

The problem encountered by many of these installers is that it is often difficult to determine the location of acoustic leaks, or quickly estimate the configuration of a wall without opening up the wall. To date, an economical and easily portable device to permit someone to easily determine the transmission loss of a wall, floor, or other room perimeter structures or simply locate acoustic leaks in the same so that it is possible to determine what are the optimum actions to be taken to increase the transmission loss of a wall, ceiling, window, pipe, or other structural element has not been developed.

SUMMARY OF INVENTION

In response to the foregoing challenges, an innovative sound focusing mechanism has been developed for generating a focused source of sound, which can be used to identify the transmission loss of an object, as well as identify areas of acoustic or thermal leakage. In accordance with the present invention, the sound focusing mechanism includes a housing. The housing includes at least one wall formed from a material having sound insulating properties. The at least one wall defines a central cavity. One end of the cavity is open. The sound focusing mechanism includes a sound generating device for generating a high decibel sound, which is located within the central cavity. An actuator assembly is operatively connected to the sound generating device for selectively operating the sound generating device. The at least one wall is configured to limit the transmission of the generated sound such that a focused beam of sound is emitted from the mechanism through the opening, thus focusing the sound through this opening.

The sound focusing mechanism includes an activation controller. This controller can be a simple button, switch or a computer controller. The computer controller selectively controls the operation of the sound generating device. The computer controller modifies the decibel level of the sound generated by the noise generating device, or controls the duration of the sound generated by the sound generating device, or controls the frequency, or controls the type of signal.

An innovative method of determining the sound transmission loss of an object has also been developed. The method includes generating a sound with a predetermined decibel level using a sound focusing mechanism and directing the source of sound on one side of the object such that the transmission of sound is substantially localized onto the object. Directing the source of sound on one side of the object may include the positioning of the opening in the sound focusing mechanism at a desired location, such as a suspected acoustic leakage point at the electrical outlet of a wall, on the object. The decibel level of sound may then be measured on an opposite side of the object. Alternatively, the sound can be measured on the same side within a surrounding box or other enclosure, or a space of low background noise. The measured decibel level may then be compared to the predetermined decibel level to estimate the transmission loss for the object. Based upon the estimated transmission loss, it is possible to estimate, determine and/or identify measures for improving the transmission loss of the object based upon the measured transmission loss. Such measures may include adding additional layers of sound insulating material, caulking a thin aperature, or building an acoustic enclosure around an electrical outlet.

In accordance with the present invention, it is contemplated that the sound focusing mechanism may be repositioned at various locations on the object to identify variations in transmissions loss within the object.

In the process of improving the acoustic efficacy of a window, it was noted that the thermal rating was equally improved. Using a similar method in estimating thermal degradation based on aperture associated acoustic rating loss, a similar thermal correlation was determined.

An innovative method of locating acoustic leakage points along an object has also been developed. Once acoustic leakage points have been identified, it is possible to propose measures including but not limited to installing additional layers of sound insulating material over or in a hole for reducing leakage, or acoustically sealing a compromise in an acoustic installation, such as a wall outlet, or a space between a wall and the floor. The method further includes generating a sound having a predetermined decibel level using a sound focusing mechanism and directing the source of sound into the object such that the sound is substantially localized on the object. The decibel level of sound emitted from the object is then measured at various locations along the object. From the measured levels, areas of higher noise emission are identified.

Whereas the Transmission Loss (TL) is a result of its transmission loss coefficient, $\tau$. That is, $$TL = -10 \log(\tau)$$

An aperture degrades the transmission loss by effecting its composite rating, or noting that there are 1, 2, . . ., n elements $$\tau_C = \tau_1 W_1/W + \tau_2 W_2/W + \ldots + \tau_n W_n/W$$

where W is the wall are in square feet or meters. Then the composite transmission loss is $$TL_C = -10 \log(\tau_C)$$

Using the same formula that demonstrates how apertures in a wall influence its acoustic performance, a good estimate of the thermal degradation caused by an aperture, as well as a method of locating the point of the thermal leakage, is provided by the focusing tube.

BRIEF DESCRIPTION OF THE DRAWINGS

The invention will be described in conjunction with the following drawings in which like reference numerals designate like elements and wherein.

DETAILED DESCRIPTION OF SEVERAL EMBODIMENTS

Figure 1:
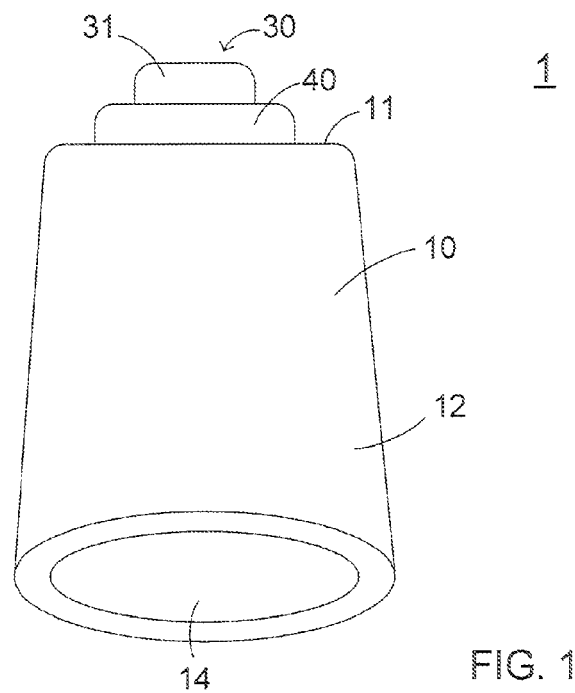
FIG. 1 is a schematic view of a sound focusing mechanism in accordance with the present invention having an actuator assembly in accordance with one embodiment of the present invention.

A sound focusing mechanism 1 in accordance with the present invention will now be described in greater detail in connection with FIGS. 1-5. The sound focusing mechanism 1 described herein will be used to determine the transmission loss of an object such as a wall, ceiling, door, window or other structure. The sound focusing mechanism 1 produces a sound that can be substantially localized onto or into an object. The sound focusing mechanism 1 will be used to locate and identify acoustic or thermal leakage points in a structure, including but not limited to walls, ceilings, floors, pipes, windows, etc. In either case, the mechanism 1 provides the individual with a simple means for locating areas of poor transmission loss or areas of high acoustic leakage so that possible remedies be readily identified and localized. Additionally, this can be performed using the focusing tube and not a large speaker and the reading taken using a single microphone and not an array. From the determination of the leakage points or transmission loss, it is possible for the person or persons performing acoustic modifications on the structure to identify certain remedies for reducing leakage and improve transmission loss.

The sound focusing mechanism 1 includes a cylindrically shaped container or housing 10 having an end wall 11, which can include an access panel 15 for providing access to a sound generating device 20 and a possible battery, and at least one side wall 12. A passageway or channel or cavity 13 is formed by the end wall 11 and the at least one side wall 12. The housing 10 further includes an opening 14 formed in one end. Alternatively, the container 10 may take various shapes and forms including but not limited to a cylindrical shaped container, a box shaped container or any other shape having an opening formed such that opening can be positioned against a desired surface so that a high decibel level of sound can be focused onto the surface.

Located within the housing 10 is a sound generating device 20. The access panel 15 provides access to the sound generating device 20 and battery assembly, which may be combined as a single unit. The access panel 15 can be threadably attached to the housing 10 or snap fit into the housing 10. The sound generating device 20 is preferably located within the interior of the housing or container 10 on the end wall 11. The location of the sound generating device 20 may vary within the channel 13 provided the sound emitted from the sound generating device 20 is directed toward the opening 14 in the container 10. The sound generating device 20 can be a noisemaker that is capable of emitting a sound of 110 db. Alternatively, the noisemaker can emit various sound emitting sound pressure levels including those above and/or below 110 db. Additionally, the sound generating device 20 can be capable of emitting a single high frequency sound or low frequency sound. The noise generating device 20 can be capable of being programmed to emit different types of sound, such as a pure tone, white noise or sweeping through specified frequencies depending on the desired testing conditions. The frequency range can include a range of 50 Hz to 5,000 Hz in accordance with the American Society for Testing and Materials (ASTM) E90 standard discussed below. A computer controller 40 can be used to perform this function.

The sound generating device 20 generates a known type of high decibel sound. The container 10 is designed to direct the sound towards the opening 14 and outwardly there from. While a certain amount of sound is transmitted through the walls 12 of the housing 10, this arrangement substantially localizes the transmission of the sound into a desired area in the object. The container 10 is formed from a material with a high STC rating. STC stands for "sound transmission class" and is a single number rating derived from measured values of sound transmission loss in accordance with the American Society for Testing and Materials (ASTM) E90 standards. The transmission loss through an object is a measure of its effectiveness in preventing the sound power incident on one side of the object from being transmitted through it and radiated on the other side. The STC provides a single number estimate of an object's performance for certain common sound reduction applications. In general, materials having low STC ratings have very low transmission losses. For example, with a wall having a field tested STC rating between 20-22, most sentences are clearly understood by an individual in another room on the other side of that wall. With a STC rating between 25-27, many phrases and some sentences can be understood without straining to hear. With a STC rating between 30-32, it is possible to clearly hear and understand some individual words and occasional phrases. With a STC rating between 35-37, medium decibel level speech is audible and occasional words are understood. With a STC rating between 40-42, loud speech and music is audible. With a STC rating between 45-47, loud speech is audible but requires straining to hear. Loud music can be heard and may be disturbing. With a STC rating between 50-52, loud speech is essentially inaudible. Music can be heard faintly but bass frequencies may be audible and possibly an annoyance. With STC ratings above 55, music may be heard faintly such that bass frequencies "thump." Loud low frequency music may still be heard very faintly if played loud with a STC rating of 60 or more. Most air-borne noise sources are effectively blocked to eliminate noise with ratings above 65.

Figure 6:
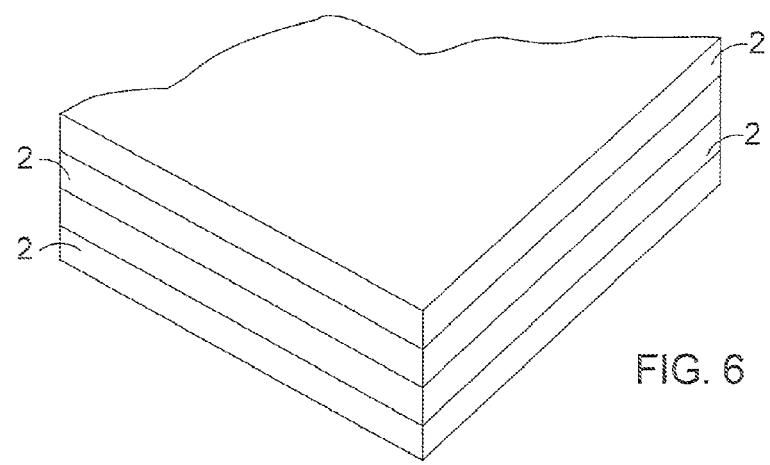
FIG. 6 is a partial schematic view of the layers of high sound transmission class material forming the walls of the sound focusing mechanism according to an embodiment of the present invention.
Figure 2:
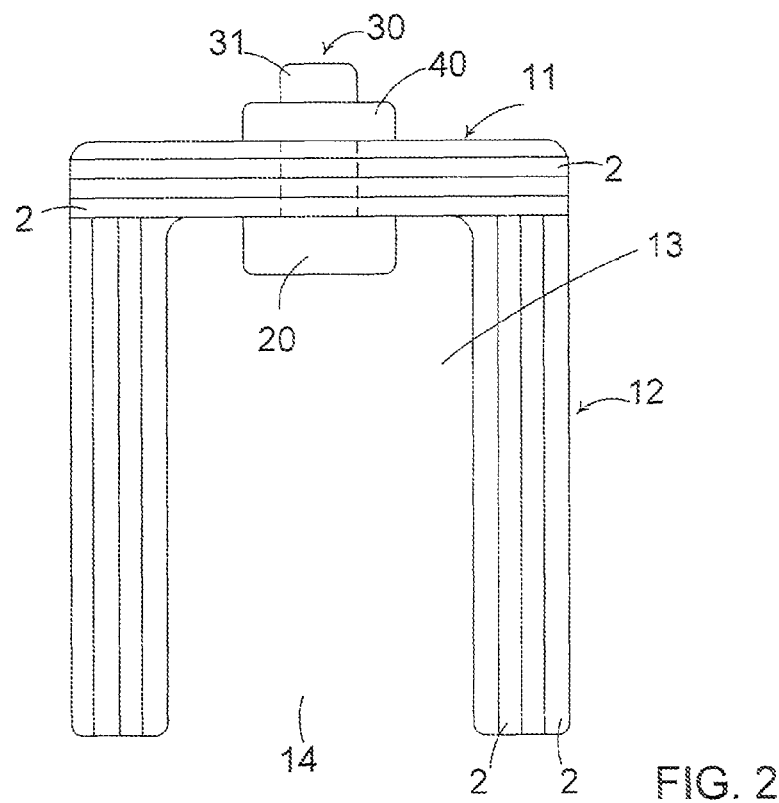
FIG. 2 is a side cross-sectional view of the sound focusing mechanism of FIG. 1.
Figure 3:
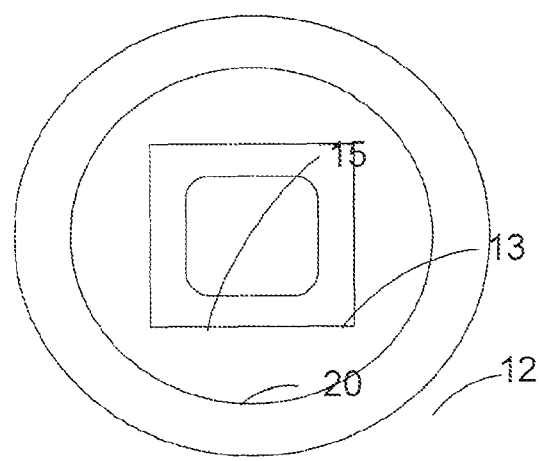
FIG. 3 is bottom view of the sound focusing mechanism of FIG. 1.

The housing or container 10 can be formed from a material having a high STC, such as for example, a one pound per square foot or greater loaded vinyl. The STC rating for the container 10 needs to be at least 30. The STC rating is preferably 40 or greater, but rarely higher than 60. The sound generating device 20 can be calibrated such that the sound emitted from the opening 14 of the housing 10 can be calibrated using a decibel ("db") meter, or spectrum analyzer. In one form, the high STC material may be formed as sheets 2. The sheets 2 may be stacked or laminated together, as shown in FIG. 2 and FIG. 6, to produce the desired STC of container 10 so that sound transmission through the end wall 111 and the at least one side wall 12 is minimized so that noise only exits the container 10 from the opening 14. Each layer 2 increases the overall STC of the housing 10. It is contemplated that a certain amount of sound will be transmitted through the walls 11 and 12 of the container 10, but at a significantly lower decibel than the sound exiting the opening 14. Alternatively, the container walls 11 and 12 may be molded from the high STC material, where the thickness of the wall is determined by the desired level of transmission loss. Using a molding process, it is possible to produce containers 10 having varying shapes and sizes.

The sound focusing mechanism 1 further includes an actuator assembly 30. The actuator assembly 30 is operatively connected to the noise generating device 20 to selectively operate the noise generating device 20. The actuator assembly 30 can take various forms. The actuator assembly 30 can be a simple actuator knob or button 31 located on the end wall 11 on the outside of the container 10, as shown in FIG. 1. With such an arrangement, the operator merely presses or operates the knob to generate a sound for a small duration of time or a continuous sound of type, such as a pure tone, or broadband noise. When a continuous sound is produced, it is contemplated that a subsequent operation of the actuator assembly 30 is necessary to discontinue the sound. While this arrangement, produces a compact sound focusing mechanism 1, the use of such an actuator assembly 30 does present one notable drawback. In particular, the tester must return to the mechanism 1 every time it is desirable to produce a pulse of sound.

Figure 5:
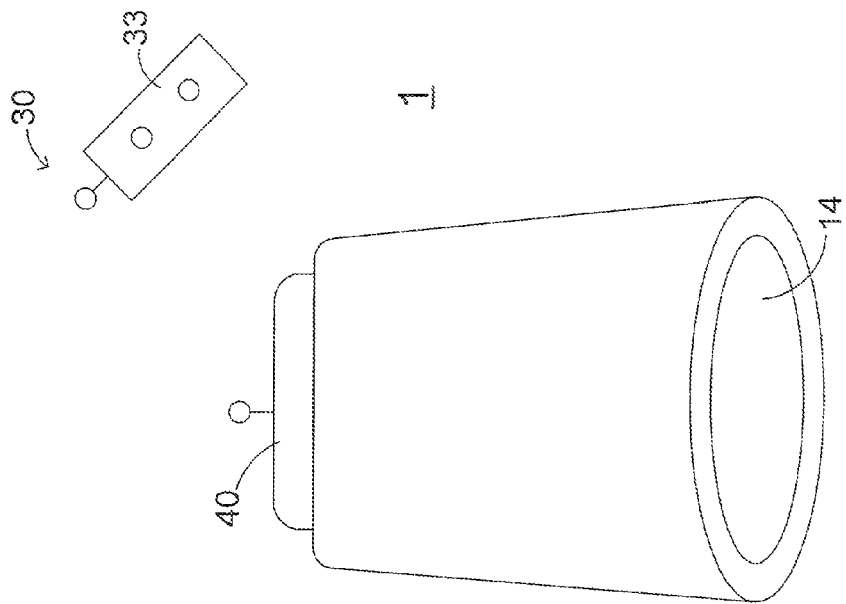
FIG. 5 is a schematic view of a sound focusing mechanism in accordance with the present invention having an actuator assembly in accordance with another embodiment of the present invention.
Figure 4:
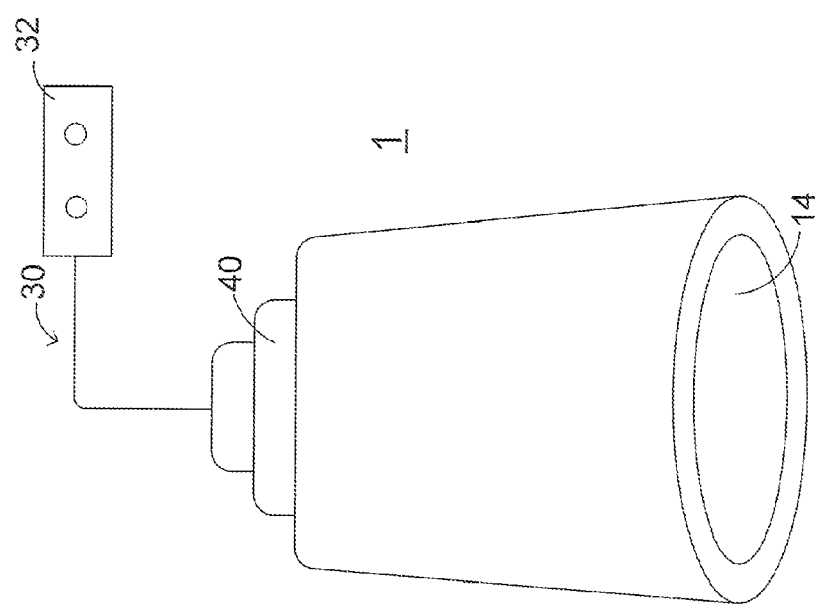
FIG. 4 is a schematic view of a sound focusing mechanism in accordance with the present invention having an actuator assembly in accordance with another embodiment of the present invention.

The actuator assembly 30 can be capable of remote activation. The actuator assembly 30 can include a remote control 32 that is hard wired to the container 10, as shown in FIG. 4. While such an arrangement permits remote activation, the distance the operator can travel from the mechanism 1 is limited. A radio controlled remote control 33 is illustrated in FIG. 5. With such an arrangement, the operator is free to travel away from the mechanism 1 while operating the mechanism 1 at any location.

The sound focusing mechanism 1 may include a computer controller 40. The controller 40 permits the operator to vary the signal type, duration and decibel level pattern of the sound generating device 20. The computer controller 40 can be used in connection with any of the above-described actuator assemblies 30. The sound generating device 20 is operatively connected to the controller 40. Furthermore, the actuator assembly 30 is operatively connected to the controller 40 to control the operation of the device 20 and/or the controller 40.

The operation of the sound focusing mechanism 1 in connection with the determination of the transmission loss of an object will now be described in greater detail. The measurement of the transmission loss will be described in connection with the measurement of the transmission loss of a wall. The method is not intended to be limited to the measurement of the transmission loss of a wall. The sound focusing mechanism 1 and the method described herein can be used to estimate the transmission loss of almost any object.

Prior to locating the opening 14 of the sound focusing mechanism 1 against a wall of a structure, the sound focusing mechanism 1 can be operated to calibrate the decibel level of the sound generated by the sound generating device 20. A decibel meter, or spectrum analyzer, can be used to take such a measurement. Once the decibel level of the sound generating device 20 is determined, the opening 14 of the container 10 is located against the wall or ceiling or the mechanism 1 can simply be held in place by an assistant. The container housing 10 can include some type of removable adhesive or other fastener or support stand or bracket to temporarily locate and secure the mechanism 1 at a desired location on the wall. The device 20 is then operated using the actuator assembly 30. The sound emitted by the device 20 is substantially localized or focused into the wall. The decibel meter is then positioned on the opposite side of the wall, at ideally the same distance from the device as the calibration reading. The decibel level on the opposite side of the wall is measured using the decibel meter to determine the transmission loss. For example, the sound focusing mechanism 1 has a noise generating device 20 generating 110 db(A). The measured decibel level on the opposite side of the wall is 40 db(A). The transmission loss of the wall is estimated as 70. The transmission loss of, for example, an opening, such as for example, for an electrical socket on the wall can also be determined in a similar manner. The opening 14 of the sound focusing mechanism 1 is located on top of the electrical socket, the decibel level on the opposite side of the wall is then determined using the decibel meter. For example, using the same sound focusing mechanism 1 generating 110 db, the measured decibel level on the opposite side of the wall behind the socket is 51 db(A). The transmission loss of the socket is 59 db. When this transmission loss of the socket is compared to the other portions of the wall, it can be seen that additional sound proofing measures, such as acoustically wrapping the outlet, are needed in order for the wall at the outlet location to reach the same transmission loss as the wall where there is no outlet. This is especially useful because it is possible to accurately determine the proper thickness and necessary STC rating of a material to improve the transmission loss. As such, it is possible to propose measures for improving transmission loss that are not in excess of desired levels, which can reduce the costs associated with sound proofing. The above described process can be repeated for almost any object located in a wall, ceiling, floor, etc.

The sound focusing mechanism 1 can also be used to determine the overall acoustic path of an object (e.g., a room), inclusive of flanking. The sound focusing mechanism 1 can be located in the center of a room and activated such that a high decibel sound is produced. The decibel meter can then be located in an adjacent room. The decibel level is then recorded. The decibel meter is then positioned at various points in the room such as the walls, the floor and the ceiling. The decibel level is then recorded in the adjacent room with the sound mechanism 1 positioned at each of these locations. By comparing these values with the measured value in the center of the room, it is possible to determine the area, surface or surfaces with the weakest transmission loss. The comparative readings give an estimate of the acoustic path of the sound from one room to another. With these readings it is possible to propose measures for improving transmission loss. For example, based upon the comparative readings, it may be desirable to add a layer of sound insulation to the floor or the ceiling, place a silencer in a duct, or caulk at the wall-floor interface.

Should it not be possible to access the other side of the wall, ceiling, floor, window, door, etc. acoustic leakage points and an estimate of the field STC can still be determined. For example, sound from sound focusing mechanism 1 can be directed at a portion of the object believed to have no leakage and reflected sound can be measured with the decibel meter, or spectrum analyzer. Then the sound focusing mechanism 1 can be moved to a different location on the object and the reflected sound can again be measured. This process may be repeated. If, at any location, the reflected sound measured by the decibel meter is reduced compared to other locations, the reduction may be caused by acoustic leakage. If the measurements are made in an area with low background noise, then the measurements may be made in the open. However, if the measurements need to be made in a noisier or reflective environment, the sound focusing mechanism, and/or the decibel meter may have at least portions located in a box or other enclosure to determine the efficacy of an acoustic installation, locate acoustic leakage points, or estimate the field STC.

The operation of the sound focusing mechanism 1 in connection with the determination of the acoustic leakage points of an object will now be described in greater detail. The method of operating the sound focusing mechanism 1 to determine acoustic leakage points will be described in connection with the testing of a pipe. The method is not intended to be so limited. The method and sound focusing mechanism 1 may be used on any object or structure where is it possible that localized acoustic leakage paths exist. For example, the method can be used to locate breaks in sound insulation in a wall or ceiling or floor or pipe wrapping or duct wrapping.

Often pipes are acoustically wrapped in order to prohibit the sound of running water to be heard. It is difficult after an installation to determine if the acoustic pipe wrapping, was completed so that the running water noise will now be inaudible. The opening 14 of the sound focusing mechanism 1 may be located on top of a pipe end or drain. The mechanism 1 is then operated. The high decibel sound is then directed through the pipe. The housing 12 permits the sound to be substantially localized into the pipe so that the user can determine any acoustic leakage. If the acoustic pipe wrapping installation was completed properly, the sound generated by the mechanism 1 will be barely audible. If there is a location in the wrapping where the seal is not complete, then the noise will be very audible. By taking the decibel meter and slowly moving it along the pipe wrapping, the decibel meter will peak at the location where there is an acoustic leakage.

It will be appreciated that numerous modifications to and departures from the preferred embodiments described above will occur to those having skill in the art. It is often difficult to allow a person to understand just how much noise a material can stop. For example, the sound focusing mechanism 1 described above can be used to illustrate the STC rating of a particular material. This is especially useful when the acoustic installer is demonstrating the high STC rating of a particular material to a prospective client. A simple illustration can be performed using the mechanism 1. The mechanism 1 can be positioned against the floor and activated such that the persons in the vicinity can see how much a high decibel sound is reduced, or a good demonstration of the amount of transmission loss is provided by the material forming the container 10. The mechanism 1 can then be lifted off the floor so that those in the vicinity can hear the difference. Thus, it is intended that the present invention covers the modifications and variations of the invention, provided they come within the scope of the appended claims and their equivalents.

The invention claimed is:

1. A method of determining the sound transmission loss of an object, comprising:
   generating and directing a source of focused sound having a predetermined decibel level on the object such that the transmission of sound is substantially localized on the object;
   measuring the decibel level of sound after the sound interacts with the object; and
   comparing the predetermined decibel level to the measured decibel level to determine the transmission loss;
   wherein the directing occurs at a plurality of locations on the object such that the transmission of sound is substantially localized on each of the plurality of locations on the object; and the measuring occurs at a plurality of corresponding locations on the object; and
   wherein the source of focused sound is generated by a sound focusing mechanism whereby the sound focusing mechanism comprises:
   a housing, wherein the housing includes at least one wall which defines a central cavity, wherein one end of the housing having an opening formed therein;
   a sound generating device for generating a sound is located within the central cavity; and
   an actuator assembly operatively connected to the sound generating device for selectively operating the sound generating device, wherein the wall limits the transmission of the sound generated by the sound generating device such that the focused sound is emitted from the sound focusing mechanism through the opening.

2. The method of determining the sound transmission loss of an object according to claim 1, wherein the directing of the source of sound on the object includes positioning the opening in the housing of the sound focusing mechanism at each of the plurality of locations on the object.

3. The method of determining the sound transmission loss of an object according to claim 1, further comprising: identifying variations in transmission loss within the object.

4. The method of determining the sound transmission loss of an object according to claim 1, further comprising: determining measures for improving transmission loss of the object based upon the measured transmission loss.

5. The method of determining the sound transmission loss of an object according to claim 1, wherein the measuring occurs on a side of the object opposite from the side at which the sound is directed.

6. A method of locating acoustic leakage points along an object, comprising:
   generating a focused sound having a predetermined decibel level;
   directing the focused sound into the object such that transmission of sound is substantially localized on the object;
   measuring a decibel level of sound transmitted through the object;
   identifying areas of the object where sound transmission is higher than sound transmission through other areas of the object; and identifying variations in transmission loss within the object;

wherein the focused sound is generated by a sound focusing mechanism whereby the sound focusing mechanism comprises:

a housing, wherein the housing includes at least one wall which defines a central cavity, wherein one end of the housing having an opening formed therein;

a sound generating device for generating a sound is located within the central cavity; and an actuator assembly operatively connected to the sound generating device for selectively operating the sound generating device, wherein the wall limits the transmission of the sound generated by the sound generating device such that the focused sound is emitted from the sound focusing mechanism through the opening.

7. The method of locating acoustic leakage points according to claim 6, wherein the directing of the source of sound into the object includes positioning the opening in a housing of a sound focusing mechanism at each of a plurality of locations on the object.

8. The method of locating acoustic leakage points according to claim 6, further comprising: determining measures for improving transmission loss of the object based upon the measured transmission loss.

9. The method of locating acoustic leakage points according to claim 6, wherein the measuring occurs on a side of the object opposite from the side at which the sound is directed.

10. The method of locating acoustic leakage points according to claim 6, wherein: the directing occurs at a plurality of locations into the object such that the transmission of sound is substantially localized on each of the plurality of locations on the object; and the measuring occurs at a plurality of corresponding locations.

11. The method of locating acoustic leakage points along an object according to claim 6, wherein the opening in a sound focusing mechanism is positioned adjacent an opening in the object.

12. A method of locating acoustic leakage points along an object, comprising:

generating a focused sound having a predetermined decibel level using a sound generating mechanism including a sound generating device positioned in a housing of the sound generating mechanism;

directing the focused sound into the object such that transmission of sound is substantially localized on the object;

measuring a decibel level of sound transmitted back from the object knowing that it is what did not pass through the object at various locations along the object; and identifying areas of the object where reflection/refraction is higher reflection/refraction through other areas of the object; and determining measures for improving transmission loss of the object based upon the measured transmission loss;

wherein the housing of the sound generating mechanism includes at least one wall which defines a central cavity; and wherein one end of the housing has an opening formed therein and wherein the wall limits transmission of the sound generated by the sound generating device such that the focused sound is emitted from the sound generating mechanism through the opening.

13. A method of locating acoustic leakage points along an object, comprising:

generating a focused sound having a predetermined decibel level;

directing the focused sound into the object such that transmission of sound is substantially localized, on the object;

measuring a decibel level of sound transmitted through the object; and identifying, areas of the object where sound transmission is higher than sound transmission through other areas of the object;

wherein the source of focused sound is generated by a sound focusing mechanism whereby the sound focusing mechanism comprises:

a housing, wherein the housing includes at least one wall which defines a central cavity, wherein one end of the housing having an opening formed therein;

a sound generating device for generating a sound is located within the central cavity; and an actuator assembly operatively connected to the sound generating device for selectively operating the sound generating device, wherein the wall limits the transmission of the sound generated by the sound generating device such that the focused sound is emitted from the sound focusing mechanism through the opening, wherein the directing of the source of sound on the object includes positioning the opening in the housing of the sound focusing mechanism at each of a plurality of locations on the object.

* * * * *